United States Patent [19]

Arnold et al.

[11] 4,076,980
[45] Feb. 28, 1978

[54] RADIOACTIVE WELL LOGGING TO MEASURE EARTH FORMATION FLUID PERMEABILITY BY ELECTROHYDRAULIC INDUCED FLOW OF RADIATION ACTIVATED FLUIDS

[75] Inventors: Dan M. Arnold; Donald J. Dowling; Wayne F. Warren, all of Houston, Tex.

[73] Assignee: Texaco Inc., New York, N.Y.

[21] Appl. No.: 735,670

[22] Filed: Oct. 26, 1976

[51] Int. Cl.² .............................................. G01V 5/00
[52] U.S. Cl. ..................................... 250/270; 73/152; 250/260
[58] Field of Search ............... 250/256, 259, 260, 270; 73/151, 152, 155

[56] References Cited

U.S. PATENT DOCUMENTS

| | | | |
|---|---|---|---|
| 2,979,134 | 4/1961 | Reed et al. | 73/152 X |
| 3,817,328 | 6/1974 | Neuman | 250/259 X |
| 3,825,752 | 7/1974 | Murphy et al. | 250/259 X |
| 4,007,366 | 2/1977 | Wiley et al. | 250/260 |

*Primary Examiner*—Archie R. Borchelt

*Attorney, Agent, or Firm*—Carl G. Ries; Thomas H. Whaley; William J. Beard

[57] ABSTRACT

Oxygen in a borehole fluid in the vicinity of a reference region, such as an earth formation of known fluid permeability, is activated with a logging instrument by being bombarded with neutrons of 14 MEV energy level to form the unstable isotope nitrogen 16 giving rise to gamma radiation. Flow of the activated fluid is then caused by an electrohydraulic flow generator which forms an intense pressure pulse in the fluid. A gamma ray detector in the logging instrument senses the amount of flow of the activated fluid within the borehole in the reference region. The logging instrument is then moved to a formation whose liquid permeability is to be tested. Borehole fluid opposite the formation to be tested is activated by neutron bombardment, again giving rise to gamma radiation, and fluid flow in the formation under test is caused by the electrohydraulic flow generator. The gamma ray detector reading of activated fluid flow in the borehole opposite the formation under test, when compared with the flow reading in the borehole opposite the reference region, is a measure of relative fluid permeability in the formation being tested.

34 Claims, 9 Drawing Figures

RADIOACTIVE WELL LOGGING TO MEASURE EARTH FORMATION FLUID PERMEABILITY BY ELECTROHYDRAULIC INDUCED FLOW OF RADIATION ACTIVATED FLUIDS

BACKGROUND OF THE INVENTION

1. Field of Invention

The present invention relates to well logging and more particularly to nuclear well logging techniques to measure the liquid permeability of earth formations.

2. Description of Prior Art

In evaluating subsurface formations for the purposes of hydrocarbon exploration of production, it is helpful to know the permeability of the formations to liquid. At the present time there is no satisfactory instrument or technique available for in situ formation permeability measurement in a well borehole.

SUMMARY OF THE INVENTION

Briefly, the present invention provides a new and improved method and apparatus for radioactive well logging to measure earth formation liquid permeability. In a reference region of known permeability, such as earth formation of known low permeability, a reference permeability measurement is obtained.

Oxygen in borehole fluid in the reference region is bombarded with neutrons of 14 MEV energy from a neutron source in a logging instrument of the present invention to activate the fluid and form the unstable isotope $_7N^{16}$ which gives rise to gamma radiation. An electrohydraulic flow generator then forms an intense pressure pulse in the fluid, causing flow of the activated formation and borehole fluid. The electrohydraulic flow generator may utilize either electrostatic arc or electromagnetic field fluid flow generation. A gamma ray detector in the logging instrument senses the amount of vertical fluid flow in the borehole in response to the flow generator by detecting gamma radiation from the activated fluid, providing a reference permeability measurement. Since the measurement is obtained in a known low permeability region, the magnitude of detected gamma radiation will be comparatively high since little, if any, fluid can be forced into the surrounding formation.

The logging instrument is then moved to a formation to be tested for liquid permeability. Fluid in the borehole adjacent this formation is activated by neutron bombardment from the neutron source, again giving rise to the characteristic decay gamma radiation of $N^{16}$. The activated borehole fluid is then subjected to a pressure pulse from the electrohydraulic flow generator and the amount of vertical fluid flow past the gamma ray detector is sensed by detecting gamma radiation from the activated borehole fluid. The amount of gamma radiation detected will be dependent on the permeability of the formation, since any activated borehole fluid moving into the formation, in response to the electrohydraulic pressure pulse will not flow vertically past the gamma ray detector. The amount of gamma radiation detected in the formation being tested may then be compared with the reference permeability measurement, so that a measure of the relative permeability of the formation being tested is obtained.

It is an object of the present invention to provide a new and improved method and apparatus for measuring earth formation liquid permeability by radioactive well logging.

DESCRIPTION OF THE PREFERRED EMBODIMENT

Before considering a detailed description of the hardware systems employed to measure the fluid permeability of subsurface earth formations according to the concepts of the present invention, it will be helpful to consider the physical principles underlying the permeability measurement according to the present invention.

The techniques of the present invention are predicated upon the creation of the unstable radioactive isotope nitrogen 16 in the fluid in a well borehole adjacent a zone or formation whose permeability to fluid is to be measured. This is accomplished by bombarding the borehole fluid with high energy neutrons having an energy in excess of approximately 10 MEV. This bombardment produces by nuclear interaction the unstable isotope nitrogen 16 from the oxygen nuclei in water molecules in the borehole fluid, the nuclear reaction being $O^{16}(n,p) N^{16}$ decays with a half life of 7.3 seconds emitting 7.12 MEV and 6.12 MEV gamma radiation.

Figure 1:
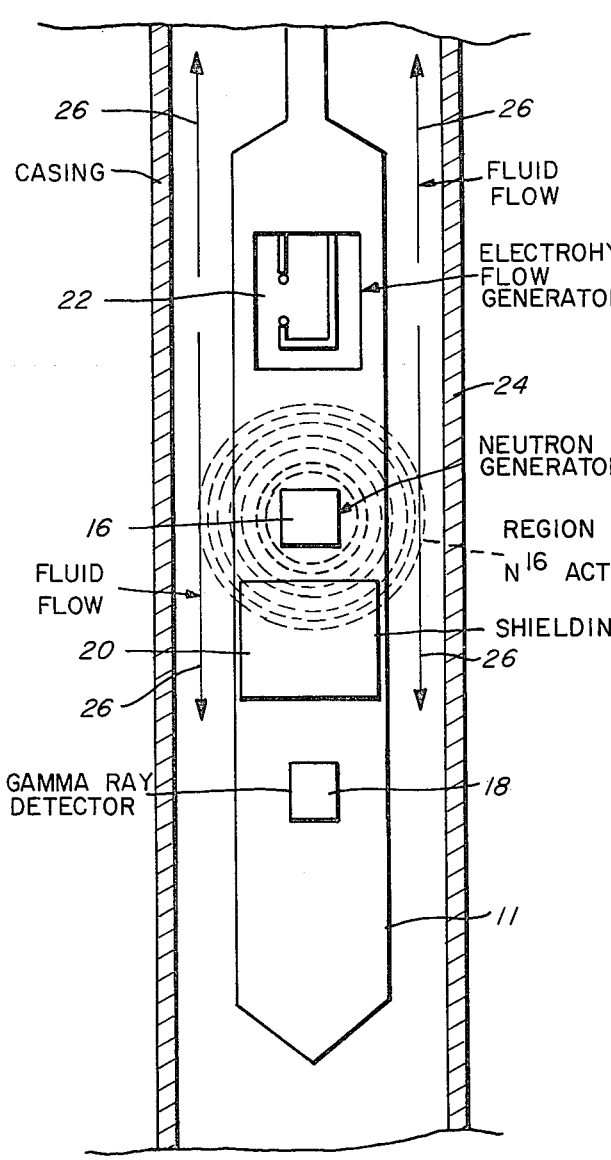
FIG. 1 illustrates schematically a permeability measuring sonde according to the present invention operating in a casing.

Referring now to FIG. 1, a downhole fluid-tight sonde 11 is shown schematically having therein a high energy, for example, 14 MEV, neutron generator 16 and a gamma ray detector 18. The gamma ray detector 18 is separated from the source 16 by suitable shielding material 20. An electrohydraulic flow generator 22, the structural details of which are to be set forth below, is mounted in the sonde 11 above the neutron generator 16. The flow generator 22 imparts a pressure pulse to borehole fluid near the sonde 11, causing flow of such fluid.

When the sonde 11 is in casing 24, which is effectively impermeable to borehole fluid, flow of the borehole fluid is restricted to flow upwardly and downwardly, as indicated by arrows 26, within the casing 24.

A reference permeability reading is obtained by locating the sonde 11 in a well casing or in a region having a formation of known, preferably low, fluid permeability. The type and pressure of such a formation of low permeability depends upon the geology of the formations in which the well is located, but might include impermeable shale or anhydrite formations and the like. Borehole fluid in the reference region is then bombarded with neutrons from the generator 16, giving rise to the unstable radioactive isotope nitrogen 16, which manifests itself by the emission of characteristic gamma radiation from the activated borehole fluid.

The borehole fluid in the vicinity of the sonde 11 is then subjected to an intense pressure pulse from the flow generator 22, causing upward and downward vertical fluid flow in the borehole as indicated by arrows 26. The amount of this fluid flow when the sonde 11 is in the reference region is detected by detecting the amount of radiation from the activated borehole fluid flowing downwardly past the gamma ray detector 18. The reading obtained in the reference region thus serves as a reference reading, with the amount of radiation detected from the activated borehole fluid at the zone of known fluid permeability providing a reference permeability reading.

Figure 2:
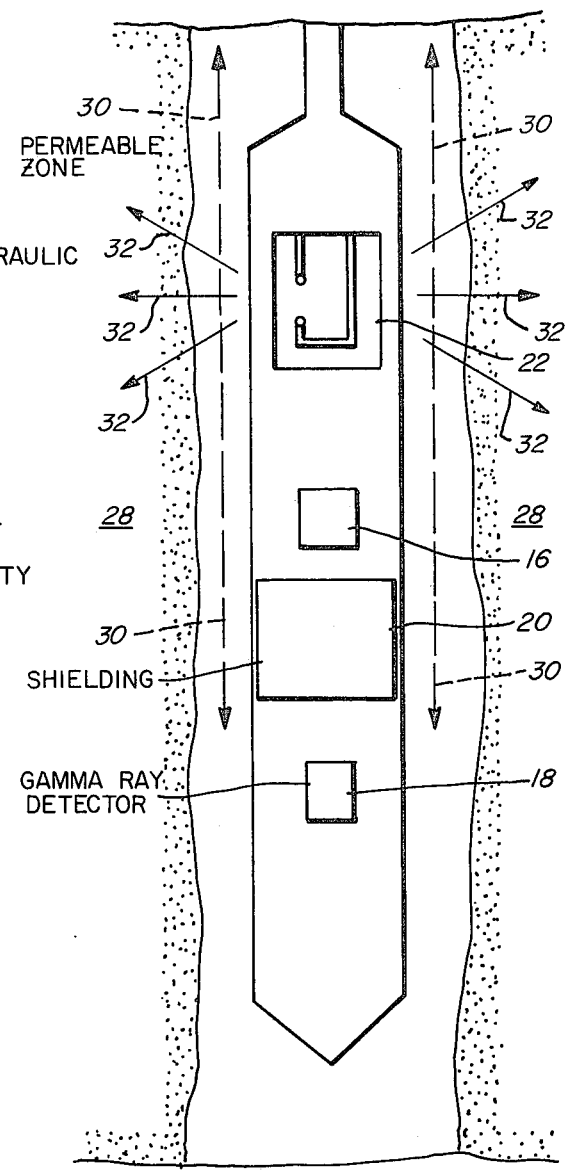
FIG. 2 illustrates schematically a permeability measuring sonde according to the present invention operating in a formation where permeability is to be measured.
Figure 3A:
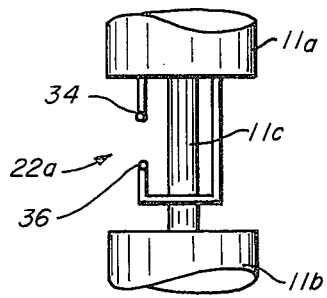
FIGS. 3A, 3B and 3C are schematic cross-sectional views of alternative electrohydraulic flow generators for causing borehole fluid flow during permeability testing according to the present invention.
Figure 3B:
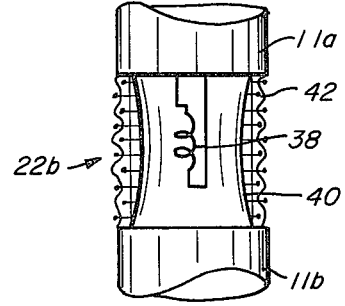
Figure 3C:
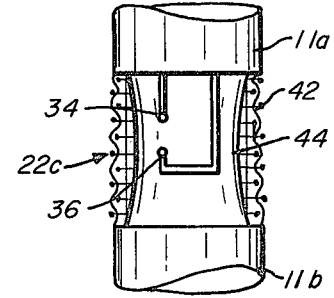

The sonde 11 is then moved into a zone or formation 28 (FIG. 2) of unknown permeability whose permeability is to be tested. In the zone whose permeability is to be tested, the borehole fluid is then again bombarded with fast neutrons from the generator 16, and the flow generator 22 activated to impart a strong radially directed pressure pulse to the activated fluid, causing flow of such fluid. In the zone whose permeability is to be tested, the radial pressure pulse imparted to the activated fluid by flow generator 22 causes fluid flow upwardly and downwardly in the borehole, as indicated by phantom arrows 30, as well as outward radial penetration of the borehole fluid into the formation 28, as indicated by the arrows 32.

To the extent that the formation 28 is permeable to fluids, the amount of borehole fluid moving radially outwardly into the formation 28 in response to the pressure pulse will increase, while vertical flow of fluid in the borehole past the gamma ray detector 18 is decreased. The amount of radiation detected by the detector 18 in the formation 28 of unknown permeability thus provides an indication of the relative permeability of the formation 28 under test, particularly when compared with the reference reading obtained in the reference region in the manner set forth above. Where the radiation reading of detector 18 in the test formation is low when compared with a low permeability reference region, the test formation is relatively highly permeable to fluid. Conversely, when the reading of detector 18 is high, the test formation is of relatively low permeability to fluids.

Having discussed the physical principles of underlying the permeability measurement techniques of the present invention, the equipment used to obtain permeability measurements will now be set forth (FIGS. 3A, 3B, 3C, 4A and 4B).

Considering first the electrohydraulic flow generator 22 more in detail, several alternative embodiments (FIGS. 3A through 3C) are suitable for use with the present invention. In these alternative embodiments, like structure bears like reference numerals.

A first flow generator 22a (FIG. 3A) may be used where the borehole fluid is known to be of a sufficient salinity to sustain an electrical arc discharge of sufficiently high level between a first electrode 34 and a second electrode 36 to cause the pressure pulse imparted to the borehole fluid. The electrodes 34 and 36 are mounted adjacent each other in a space in the sonde 11 open to the borehole fluid. The electrodes 34 and 36 extend into this space through suitably seals and insulation from an upper portion 11a of the sonde 11, and are electrically connected to energy storage capacitors mounted in the sonde 11 in a manner to be set forth. The upper portion 11a of the sonde 11 is connected to a lower portion 11b thereof by suitable supports 11c having electrical conductors therein to provide electrical connection with lower portions of the sonde 11 as will be set forth.

The energy storage capacitors in the sonde 11 are charged to a high voltage level with electrical energy which is stored and then discharged across the gap between the electrodes 34 and 36 in response to control signals from the surface, giving rise to an intense high pressure shock wave which is transmitted to the borehole fluid. Further details of this technique of electrohydraulic flow generation are set forth in the article "Electrohydraulics", *Science Journal,* March, 1968, pages 61 through 66.

A second flow generator embodiment 22b (FIG. 3B) according to the present invention utilizes an electromagnetic "hammer" technique of forming the intense pressure pulse to be imparted to the borehole fluid. In the generator 22b, a low inductance magnetic coil 38 is mounted within the space in the sonde 11 between body portions 11a and 11b interior of a cylindrical conductive metal plate 40. The supports connecting body portions 11a and 11b are not shown in generator 22b to more clearly show other structure thereof. The coil 38 is electrically connected through a suitable switch to the capacitor bank storing the electrical energy. The conductive plate 40 is mounted within a cylindrical screen 42 between the portions 11a and 11b of the sonde 11.

When the electrical energy stored in the capacitor banks is discharged through the coil 38, an intense magnetic field is caused, thereby inducing strong eddy currents in the adjacent conductive metal plate 40 forcibly moving the plate 40 outwardly. The screen 42, however, due to its mesh construction is not easily susceptible to the strong eddy currents and remains comparatively stationary.

Movement of the plate 40 in response to these eddy currents imparts a pressure pulse to the borehole fluid, expelling borehole fluid between the plate 40 and the screen 42 and causing fluid flow of the borehole fluid. Further details of the technique of magnetically inducing eddy currents to cause movement of metal plates are set forth, for example, in the article "Magnetic Forming," *Science Journal,* December, 1965, pages 66 through 71. The cylindrical metal plate 40 is, however, of dimensions selected to resist destructive deformation by the eddy currents described in this article and is typically eight inches or more in height and one-quarter inch or more in thickness. The plate 40 is also chosen from a suitable high strength alloy to further resist such destructive deformation.

In a third flow generator embodiment 22c of the present invention, electric arc discharge is used to impart the pressure pulse to the borehole fluid, as with flow generator 22a. The electrodes 34 and 36 are electrically connected to a capacitor bank and switch in a like manner to the generator 22a. However, in flow generator 22c, the electrodes 34 and 36 are immersed and contained in a fluid of desired salinity enclosed within a flexible cylindrical diaphragm container wall 44 is mounted between body portions 11a and 11b of the sonde 11. Supports between the body portions 11a and 11b are provided, but are not shown, in order to more clearly show other structure of the flow generator 22c.

The fluid within container wall 44 possesses a salinity chosen to insure that an electric arc discharge of proper strength is formed to impart the pressure pulse to the borehole fluid. The diaphragm 44 is enclosed within screen 42 and borehole fluid fills the space between the diaphragm and the screen 42. When the switch is closed permitting the electrical energy in the charged capacitor bank to be applied to form a pressure pulse between electrodes 34 and 36, the diaphragm 44 is forced outwardly in response to the electric arc discharge in the fluid contained therein, imparting the pressure pulse to the borehole fluid.

Referring again to FIGS. 1 and 2, the detector 18 was shown and described as mounted so as to sense radiation in borehole fluid flowing downwardly therepast. However, it should be understood that the gamma ray detector 18 may be mounted in the sonde 11 so as to measure either upward or downward flow of activated fluid in response to the flow generator 22.

Figure 4A:
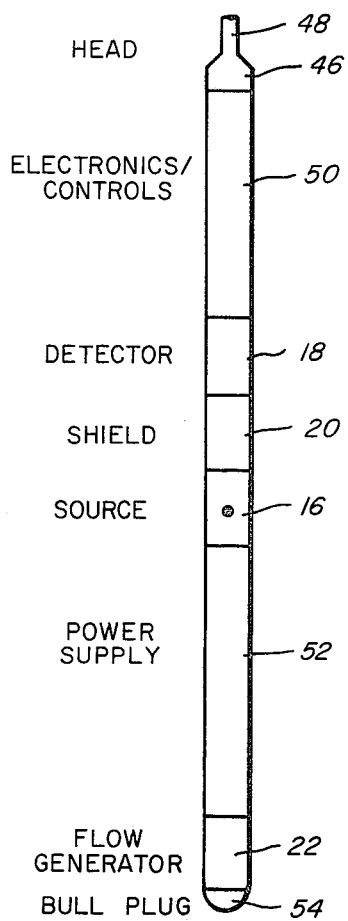
FIGS. 4A and 4B are schematic representations of the downhole portion of a permeability measuring radioactive well logging systems according to the present invention.
Figure 4B:
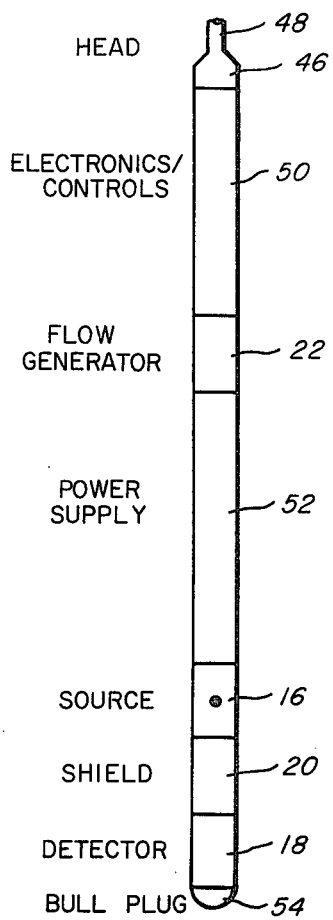

Considering now FIGS. 4A and 4B, sonde configurations to obtain these measurements are shown. Like structure in FIGS. 4A and 4B to other figures in the drawings bears like reference numerals. The sonde 11 (FIG. 4B) senses downward flow of activated borehole fluid and is provided with a head member 46 which receives an armored well logging cable 48 by which the sonde 11 is moved in the well bore. A control and detector electronic section 50 is attached to the head section and has the flow generator 22 mounted therebeneath.

The electronics/control section 50 of the downhole sonde 11 functions, as will be set forth in detail below, to control the operation of the neutron generator 18 and to provide synchronization (or "sync") and control pulses during each cycle of operation to measure fluid permeability in the formation. The electronics/control section 50 further contains circuit means to transmit electrical pulse signals from the detectors and sync pulse signals up the well logging cable 48 to the surface. Finally, the electronic section 50 also contains therein the capacitor banks and switches necessary to provide electrical energy and control signals to the flow generator 22 in the manner set forth above.

The neutron generator 16 is mounted below the flow generator 22 and has the shielding 20 therebeneath. Since the sensing of fluid flow is predicated on the activation of oxygen nuclei in the borehole fluid by the capture of neutrons with energy equal to or greater than 10 MEV, the neutron generator 16 must have an energy of 10 MEV or greater. The most commonly available such neutron generator is of the type relying on the deuterium-tritium reaction to generate a flux of high energy neutrons at a sufficient intensity to perform this type of measurement. The deuterium-tritium reaction neutron generators are generally referred to as accelerator-type neutron sources.

Accelerator-type neutron sources generally comprise an evacuated envelope having a target material at one end thereof which is impregnated with a high percentage of tritium. The target is kept at a high negative potential approximately 125 KV, with respect to the source of deuterium nuclei which are to be accelerated onto it. At the opposite end of the evacuated container is an ion source and a source of deuterium nuclei usually termed a replenisher. In operation, such accelerator sources generate a concentration of deuterium ions from the ion source which are focused by electrostatic lenses into a beam and accelerated by the high negative potential onto the target material which is impregnated with the tritium nuclei. Due to the high acceleration voltage, the electrostatic Coulomb repulsion between the deuterium nuclei and the tritium nuclei is overcome and the $H^3$ ($H^2$,n) $He^4$ reaction takes place generating a relatively high intensity of neutrons having an energy level of approximately 14 MEV.

The neutron generator 16 is preferably a pulsed neutron generator, with the gamma ray detector 18 being delayed in activation for a period subsequent to cessation of the neutron bursts from the source 16. If the gamma ray detection 18 is delayed a sufficient period after each burst of neutrons from the generator 16, prompt gamma radiation resulting from neutron inelastic scatter and thermal neutron capture reactions decays to a negligible level. By then counting the activation induced gamma radiation which remains for an appropriate period of time, relatively high level background radiation may be significantly reduced. Neutron activation reactions with elements other then oxygen produce gamma radiation whose energy is less than 5 MEV. Interference from these reactions can be eliminated by biasing the gamma ray detector 18 to record gamma radiation of 5 MEV or greater. This bias also eliminates interference from naturally occurring radioactive elements commonly found in earth formations. Accordingly, by using a pulse neutron generator and time gating and energy biasing the detector 18, the signal-to-noise ratio of radiation detected in the detector 18 is increased, while the statistical error in measurements obtained is reduced.

The gamma ray detector 18, which preferably comprises a thalium activated sodium iodide crystal detector is mounted beneath the shielding material 20, with a bull plug or nose plug 54 mounted at an end opposite the neutron generator 16. A power supply 52 is mounted above the source 16.

In order to detect borehole fluid flow in an upward direction, those skilled in the art realize that the borehole fluid must first be activated with neutrons from the neutron source 16 and then subsequently subjected to the pressure pulse from the flow generator 22 to move upwardly past the detector 18 and give an indication of formation permeability. This implies the configuration illustrated in FIG. 4A where the detector 18 of the well logging instrument is placed above the shield 20 with neutron generator 16 located between the detector 18 and the flow generator 22.

However, in order to detect borehole fluid flow in a downward direction, the configuration illustrated in FIG. 4B is required wherein the borehole fluid is first activated by neutrons from the neutron source 16 and a pressure pulse imparted to the borehole fluid from the flow generator 22 above the neutron source 16, causing the activated borehole fluid to move downwardly past the gamma ray detector 18 in order to obtain the formation permeability measurement in the manner previously described. In the configuration of FIG. 4B, the neutron source-power supply section 52 must be placed above the detector section 18 on the downhole instrument.

Since the gamma ray detector 18 must be located within a reasonable distance of the neutron generator target, the tritium impregnated target of neutron source 16 must be located as close as possible to the shield portion 20 of the detector section 18 of the instrument. Thus, the power supply 52 section is reversible (i.e. connectable to operate from either end) when going from the configuration shown in FIG. 4A to that shown in FIG. 4B in order to detect flow of activated borehole fluid either in an upward or a downward direction, respectively. Similarly, all of the component portions of the downhole instrument of FIGS. 4A and 4B are constructed in a modular fashion. These modules may be joined by screw type fluid tight assemblies and sealed against the incursion of borehole fluid by sealing means at each of these junctions. Lastly, a bull plug or nose plug 54 is mounted at the lower end of the sonde 11 to protect the sonde 11 and remaining portions of the instrument against damage from contact with the well bottom or an obstruction or objects in the well bore.

Figure 5:
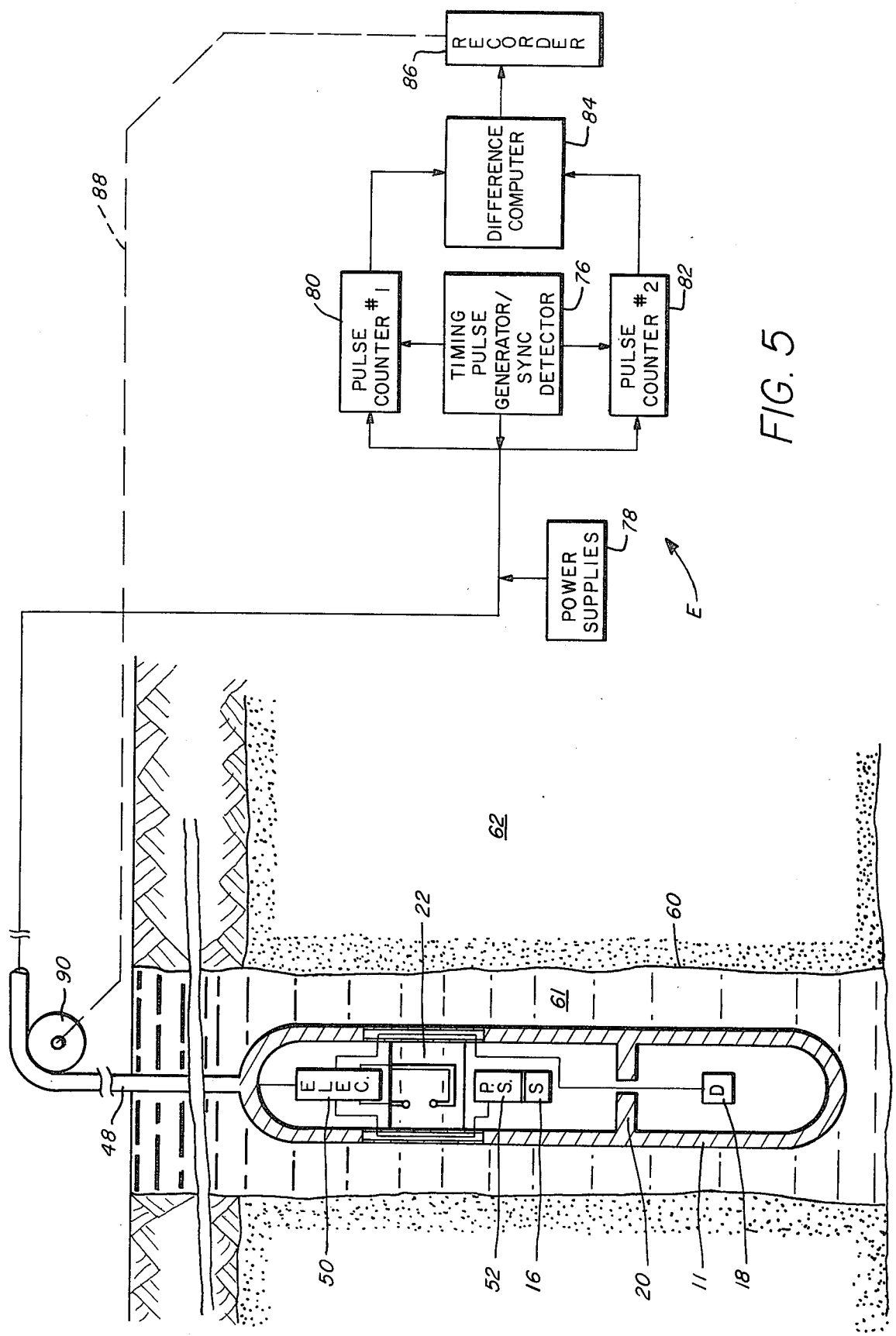
FIG. 5 is a schematic representation of a permeability measuring radioactive well logging system according to the present invention.

Referring now to FIG. 5, a well logging system in accordance with the concepts of the present invention is shown in a borehole environment with the surface equipment portion thereof and is illustrated schematically. The downhole sonde 11 in practice is constructed in the modular manner illustrated with respect to FIGS. 4A or 4B, is suspended in a well borehole 60 by the armored well logging cable 48 to a formation 62 as previously described. The borehole 60 adjacent the formation 62 is filled with borehole fluid 61. The downhole sonde 11 is provided with gamma ray detector 18 shown mounted in the configuration shown in FIG. 4B for detecting flow of activated borehole fluid 61 in a downward direction. The sonde 11 is also provided with the 125 KV power supply 52 and neutron generator 16 and electronics section 50 of the type previously described.

In the configuration shown in FIG. 5, high energy neutrons from the neutron source 16 bombard the borehole fluid 61 and activate the elemental oxygen in such borehole fluid 61 and form the isotope nitrogen 16 therein. The neutron generator 16 is pulsed at 100 pulses per second using a 1 millisecond burst width. The gamma ray detector 18 is activated for 5.9 milliseconds starting 3 milliseconds after the end of the neutron burst and is biased at 5 MEV. The recorded gamma radiation is substantially only gamma radiation resulting from the decay of the radioactive isotope nitrogen 16.

A background reading is then taken in the borehole 60 with the detector 18 to determine the induced nitrogen −16 gamma radiation in the borehole fluid 61 and formation 62 in the absence of fluid flow. A fluid pressure pulse is then imparted by flow generator 22 to the activated borehole fluid 61, causing flow of the activated fluid past the detector 18, in the manner described. The increase in gamma radiation resulting from the flowing activated borehole fluid is then detected in the detector 18, and electrical pulses formed in response to the impinging gamma rays detected by the detector 18 are transmitted to the electronic section 50 of the downhole instrument and from there coupled to the well logging cable 48 conductors and transmitted to the surface for processing in a manner to be described.

Figure 6:
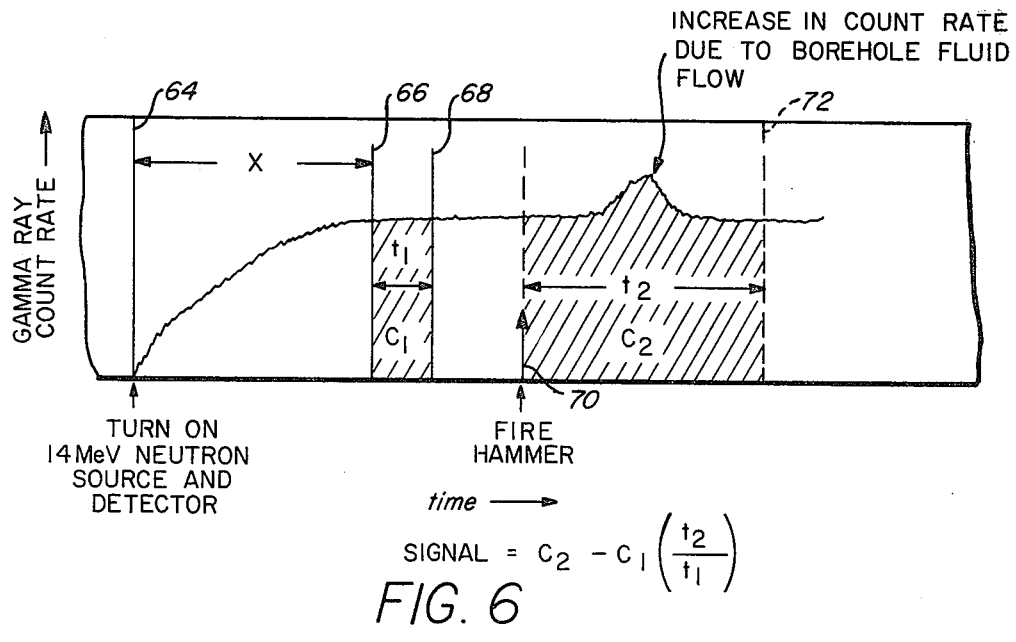
FIG. 6 is a graphical representation of data obtained during well logging according to the present invention.

Referring now to FIG. 6, an example count rate from detector 18 is shown. At time 64, the neutron source 16 and gamma ray detector 18 are activated and are operating in the pulsed-timing sequence previously described. During the time interval $x$, the nitrogen −16 activity, as recorded by detector 18, builds up and approaches a saturation level at time 66. At time 66, the total counts C, detected by detector 18 during the time interval $t_1$ until time 68 is recorded. The quantity $C_1/t_1$ is the nitrogen −16 count rate under noflow conditions.

At a time 70, the flow generator 22 is activated, causing a pressure pulse to be imparted to the activated borehole fluid, and causing flow of the activated borehole fluid past the detector 18 at a rate determined in part by the fluid permeability of the formation being tested. Starting at time 70, the total counts $C_2$ detected by detector 18 are recorded during the time interval $t_2$ until time 72. At time 72, the sonde is then moved to the next formation to be tested and the sequence of events starting at time 64 is repeated.

Electrical pulse signals representative of detected gamma rays impinging upon the detector 18 in the downhole sonde 11 are coupled continuously through conductors of the well logging cable 48 for transmission to the surface and receipt by an electronic processing circuit E of the well logging instrumentation of the present invention.

A timing circuit 76 detects synchronization pulses initiated in the downhole electronics 50 when the source 16 is activated, as provided over the cable 48 and provides timing and control signals to the remaining portions of the surface electronic circuit E. Suitable power supplies 78 for the surface electronics E and downhole instrumentation are provided. Power for downhole instrumentation is electrically connected over conductors of the cable 48.

A first pulse counter 80 of the circuit E is activated by a timing pulse generator 76 during the time interval $t_1$ and counts the total number of gamma rays impinging upon detector 18 in response to activation of borehole fluid 61 and formation 62 by bombardment with neutrons from the source 16. A second pulse counter 82 is controlled by the timing circuit 76 and is activated for the time interval $t_2$ to count the total number of gamma rays impinging upon the detector 18 in response to activation of borehole fluid 61 and formation 62 and to the flow of activated borehole fluid past detector 18 in response to the pressure pulse from the flow generator 22 in order to obtain a measure of the permeability of the formation being tested. As has been set forth above, the relative count of gamma rays is a measure of the relative fluid permeability of the formation being tested.

Accordingly, the first counter 80 counts $C_1$, the background gamma ray count rate in response to activation of the borehole fluid and formation, providing a measure of the background radiation intensity in the borehole as a result of bombardment of such fluid and formation by the source 16. The second counter 82 counts $C_2$, the number of gamma rays in the vicinity of the detector 18 for the time interval for which such counter is energized, providing a measure of the relative amount of flow of activated borehole fluid past the detector 18 in response to a pressure pulse from the flow generator 22, thereby giving a measure of the relative permeability of the formation being tested.

The counts from the counter 80 and 82 are provided to a difference computing circuit 84, which may be either an analog or digital circuit, or a properly programmed general purpose digital computer such as a Model PDP-11 computer supplied by the Digital Equipment Corp. of Cambridge, Mass. Such a general purpose computer may be properly programmed in accordance with the principles of the invention in a suitable programming language such as FORTRAN or the like. Where the time intervals $t_1$ and $t_2$ of counting by the counters 80 and 82 differ, the difference computer 84 may be modified or programmed to normalize such count rate so that a direct measure of the relative permeability of the formation under test is provided. Output signals $C_2 - (C_1(t_2/t_1))$ representative of the measure of the formation permeability are then provided from the computer 84 to a recorder or display device 86. The recorder or display device 86, as indicated by a broken line 88, may be electrically or mechanically coupled to a sheave wheel 90 in order to display the permeability in the formations of interest as a function of depth of the well logging instrument in the borehole.

The foregoing disclosure and description of the invention are illustrative and explanatory thereof, and various changes in the size, shape and materials, as well as in the details of the illustrated construction may be made without departing from the spirit of the invention.

We claim:

1. A method of measuring the fluid permeability of subsurface earth formations in the vicinity of a well borehole, comprising the steps of:
   (a) bombarding fluid in the borehole with high energy neutrons to activate the borehole fluid to thereby emit radiation;
   (b) imparting a radially directed pressure pulse to the activated fluid to cause flow of the activated fluid;
   (c) detecting the amount of radiation from activated fluid flowing vertically in the borehole in response to said pressure pulse to thereby obtain a measure of the fluid permeability of the formations.

2. The method of claim 1, wherein:
   (a) said step of bombarding includes the step of bombarding fluid in the borehole at a zone of known fluid permeability; and
   (b) said step of detecting includes detecting the amount of radiation from activated fluid flowing vertically in the borehole at the zone of known fluid permeability to thereby obtain a reference permeability reading.

3. The method of claim 2, wherein:
   (a) said step of bombarding also includes the step of bombarding fluid in the borehole at a zone of unknown fluid permeability; and
   (b) said step of detecting also includes detecting the amount of radiation from activated fluid flowing vertically in the borehole at the zone of unknown fluid permeability to thereby obtain a test permeability reading for the formation of unknown fluid permeability.

4. The method of claim 1, wherein:
   (a) said step of bombarding includes the steps of:
      (1) bombarding fluid in the borehole at a zone of known fluid permeability to thereby activate the fluid; and
      (2) bombarding fluid in the borehole at a zone of unknown fluid permeability to thereby activate the fluid; and
   (b) said step of imparting a pressure pulse includes the steps of:
      (1) imparting a pressure pulse to the borehole at the zone of known fluid permeability; and
      (2) imparting a pressure pulse to the borehole at the zone of unknown fluid permeability; and
   (c) said step of detecting includes the steps
      (1) detecting the amount of radiation from activated borehole fluid at the zone of known fluid permeability to thereby obtain a reference permeability reading; and
      (2) detecting the amount of radiation from activated borehole fluid at the zone of known fluid permeability to thereby obtain a test permeability reading for the formation of unknown fluid permeability.

5. The method of claim 4, further including the step of:
comparing the amounts of radiation detected in the zone of known fluid permeability and the formation of unknown fluid permeability.

6. The method of claim 1, further including the step of:
forming an output record of the amount of radiation detected.

7. The method of claim 1, wherein said step of bombarding comprises the step of:
bombarding fluid in the borehole with neutrons having an energy in excess of 10 MeV.

8. The method of claim 7, wherein said step of bombarding comprises the step of:
bombarding fluid in the borehole with neutrons to form the isotope nitrogen 16 from oxygen.

9. The method of claim 1, wherein said step of bombarding comprises the step of:
bombarding fluid in the borehole with neutrons to cause an element of the borehole fluid to emit gamma rays.

10. The method of claim 1, wherein said step of imparting a radially directed pressure pulse comprises the step of:
forming a pressure pulse in an electrohydraulic flow generator.

11. The method of claim 1, wherein said step of imparting a pressure pulse comprises the step of:
discharging an electric arc in the borehole fluid.

12. The method of claim 1, wherein said step of imparting a pressure pulse comprises the step of:
   (a) discharging an electric arc in a container of fluid to form the pressure pulse; and
   (b) transmitting the pressure pulse into the borehole fluid through a wall of the container.

13. The method of claim 1, wherein said step of imparting a pressure pulse comprises the steps of:
   (a) discharging electric current through a low inductance coil in the vicinity of a conductive plate to form eddy currents to move the plate and form the pressure pulse; and
   (b) transmitting the pressure pulse into the borehole fluid through the plate.

14. The method of claim 1, wherein said step of detecting comprises:
sensing the amount of radiation with a radiation sensor.

15. The method of claim 14, wherein said step of imparting comprises the step of:
moving the activated fluid upwardly past the radiation sensor.

16. The method of claim 14, wherein said step of imparting comprises the step of:
moving the activated fluid downwardly past the radiation sensor.

17. The method of claim 14, wherein gamma radiation is emitted from the borehole fluid in response to said step of bombarding and wherein said step of detecting comprises:
sensing the amount of gamma radiation with a gamma ray detector.

18. An apparatus for measuring the fluid permeability of subsurface earth formations in the vicinity of a well borehole, comprising:
   (a) means for bombarding fluid in the borehole with high energy neutrons to activate the borehole fluid to thereby emit radiation;

(b) means for imparting a radially directed pressure pulse to the activated fluid to cause flow of the activated fluid; and (c) means for detecting the amount of radiation from activated fluid flowing in the borehole in response to the pressure pulse to thereby obtain a measure of the fluid permeability of the formations.

19. The structure of claim 18, further including:
sonde means for containing said means for bombarding, said means for imparting and said means for detecting.

20. The structure of claim 19, further including:
means for moving said sonde means to borehole zones of known fluid permeability to obtain reference readings from said means for detecting.

21. The structure of claim 19, further including:
means for moving said sonde means to borehole zones of unknown fluid permeability to obtain test readings from said means for detecting.

22. The structure of claim 18, wherein said means for detecting detects the amount of radiation in a zone of known fluid permeability and in a formation of unknown fluid permeability and further including:
means for comparing the amounts of radiation detected in the zone of known fluid permeability and the formation of unknown fluid permeability.

23. The structure of claim 18, further including:
means for forming an output record of the amount of radiation detected.

24. The structure of claim 18, wherein said means for bombarding comprises:
means for bombarding fluid in the borehole with neutrons having an energy in excess of 10 MEV.

25. The structure of claim 24, wherein said means for bombarding comprises:
means for bombarding fluid in the borehole with neutrons to form the isotope nitrogen 16 from oxygen.

26. The structure of claim 18, wherein said means for bombarding comprises:
means for bombarding fluid in the borehole with neutrons to cause an element of the borehole to emit gamma rays.

27. The structure of claim 18, wherein said means for imparting a pressure pulse comprises:
an electrohydraulic flow generator.

28. The structure of claim 18, wherein said means for imparting a pressure pulse comprises:
means for discharging an electric arc in the borehole fluid.

29. The structure of claim 18, wherein said means for imparting a pressure pulse comprises:
(a) means for discharging an electric arc in a container of fluid to form a pressure pulse; and
(b) means for transmitting a pressure pulse into the borehole fluid through a wall of the container.

30. The structure of claim 18, wherein said means for imparting a pressure pulse comprises:
(a) means for discharging electric current through a low inductance coil in the vicinity of a conductive plate to form eddy currents to move the plate; and
(b) means for transmitting the motion of a conductive plate to the borehole fluid.

31. The structure of claim 18, wherein said means for detecting comprises:
a radiation sensor.

32. The structure of claim 31, wherein said means for imparting comprises:
means for moving the activated fluid upwardly past said radiation sensor.

33. The structure of claim 31, wherein said means for imparting comprises:
means for moving the activated fluid downwardly past said radiation sensor.

34. The structure of claim 31, wherein gamma radiation is emitted from the borehole fluid in response to said means for bombarding and wherein said radiation sensor comprises:
a gamma ray detector.

* * * * *